(12) United States Patent
Bradbury et al.

(10) Patent No.: US 10,241,757 B2
(45) Date of Patent: *Mar. 26, 2019

(54) DECIMAL SHIFT AND DIVIDE INSTRUCTION

(71) Applicant: INTERNATIONAL BUSINESS MACHINES CORPORATION, Armonk, NY (US)

(72) Inventors: Jonathan D. Bradbury, Poughkeepsie, NY (US); Steven R. Carlough, Poughkeepsie, NY (US); Reid T. Copeland, Richmond Hill (CA); Silvia Melitta Mueller, Altdorf (DE); Eric M. Schwarz, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 68 days.

This patent is subject to a terminal disclaimer.

(21) Appl. No.: 15/281,245

(22) Filed: Sep. 30, 2016

(65) Prior Publication Data

US 2018/0095724 A1    Apr. 5, 2018

(51) Int. Cl.
*G06F 7/535* (2006.01)
*G06F 5/01* (2006.01)
*G06F 7/491* (2006.01)

(52) U.S. Cl.
CPC .............. *G06F 7/535* (2013.01); *G06F 5/01* (2013.01); *G06F 7/4917* (2013.01); *G06F 2205/003* (2013.01); *G06F 2207/535* (2013.01)

(58) Field of Classification Search
CPC ....... G06F 7/535; G06F 7/4915; G06F 7/4917
See application file for complete search history.

(56) References Cited

U.S. PATENT DOCUMENTS

| | | | |
|---|---|---|---|
| 4,390,961 A | 6/1983 | Negi | |
| 5,426,600 A | 6/1995 | Nakagawa | |
| 5,969,326 A * | 10/1999 | Ogami | G06K 7/14 235/462.27 |
| 6,560,624 B1 | 5/2003 | Otani et al. | |
| 7,167,889 B2 | 1/2007 | Busaba et al. | |
| 7,337,302 B2 | 2/2008 | Ohtani et al. | |
| 7,584,237 B1 | 9/2009 | Tan et al. | |
| 7,689,641 B2 | 3/2010 | Abel et al. | |
| 7,912,890 B2 | 3/2011 | Cornea-Hasegan | |

(Continued)

FOREIGN PATENT DOCUMENTS

JP            403083127 A        4/1991

OTHER PUBLICATIONS

Schwarz, E.M. et al., "Decimal Floating-Point Support on the IBM System z10 Processor," IBM Journal of Research and Development, vol. 53, No. 1, Jan. 2009, pp. 4:1-4:10.

(Continued)

*Primary Examiner* — Chuong D Ngo
(74) *Attorney, Agent, or Firm* — Heslin Rothenberg Farley & Mesiti P.C.; Steven Chiu

(57) ABSTRACT

An instruction to perform a shift and divide operation is executed. The executing includes shifting a value in a specified direction by a selected amount to provide a dividend, the selected amount being user-defined. The dividend is divided by a divisor to obtain a quotient. At least a subset of the quotient is selected as a result. The result is to be used in processing within the computing environment.

12 Claims, 11 Drawing Sheets

(56) References Cited

U.S. PATENT DOCUMENTS

| | | | |
|---|---|---|---|
| 8,725,786 B2 | 5/2014 | Powell | |
| 2008/0270756 A1 | 10/2008 | Lundvall | |
| 2013/0246740 A1* | 9/2013 | Bradbury | G06F 9/30043 |
| | | | 712/204 |
| 2014/0059096 A1 | 2/2014 | Kitamura | |
| 2014/0059097 A1 | 2/2014 | Kitamura | |
| 2015/0378681 A1* | 12/2015 | Burgess | G06F 7/537 |
| | | | 708/209 |
| 2016/0004505 A1 | 1/2016 | Elmer | |

OTHER PUBLICATIONS

Ivanescu, Gabriele, "Fixed Point Arithmetic and Tricks," XP055431813, retrieved from the Internet: URL:http://x86asm.net/articles/fixed-point-arithmetic-and-tricks/, retrieved on Dec. 5, 2017, section "Multiplication", pp. 1-9.

Anonymous, "Faster Decimal Division", IBM Technical Disclosure Bulletin, vol. 31, No. 8, Jan. 1989, XP000023865.

International Search Report and Written Opinion for PCT/EP2017/073877 dated Dec. 15, 2017, pp. 1-12.

International Search Report and Written Opinion for PCT/EP2017/073875 dated Dec. 14, 2017, pp. 1-12.

Mel, Peter and Tim Grance, "The NIST Definition of Cloud Computing," National Institute of Standards and Technology, Information Technology Laboratory, Special Publication 800-145, Sep. 2011, pp. 1-7.

IBM, "z/Architecture—Principles of Operation," IBM Publication No. SA22-7832-10, Mar. 2015, pp. 1-1732.

IBM, "Power ISA—V2.07B", Apr. 9, 2015, pp. 1-1527.

Gonzalez-Navarro, Sonia et al., "A Study of Decimal Left Shifters for Binary Numbers," Information and Computation 216, Mar. 2012, pp. 47-56.

Lang, Tomas et al., "Division Unit for Binary Integer Decimals," $20^{th}$ IEEE International Conference on Application-specific, Architectures and Processors, Jul. 2009, pp. 1-7.

Anonymous, "Method for the Compress Tree of a 32-Bit Integer Multiplier," IP.com No. IPCOM000018662D, Jul. 30, 2003, pp. 1-11.

Castellanos, Ivan et al., "Decimal Partial Product Generation Architectures," $51^{st}$ Midwest Symposium on Circuits and Systems, Sep. 2008, pp. 962-965.

Castellanos, Ivan et al., "Compressor Trees for Decimal Partial Product Reduction," Proceedings of the 18th ACM Great Lakes Symposium on VLSI, May 2008, pp. 107-110.

Bradbury, Jonathan D. et al., "Decimal Multiply and Shift Instruction," U.S. Appl. No. 15/281,223, filed Sep. 30, 2016, pp. 1-51.

List of IBM Patents or Patent Applications Treated as Related, dated Oct. 4, 2016, pp. 1-2.

Bradbury et al., "Decimal Multiply and Shift Instruction," U.S. Appl. No. 15/806,854, filed Nov. 8, 2017, pp. 1-45.

Bradbury et al., "Decimal Shift and Divide Instruction," U.S. Appl. No. 15/806,862, filed Nov. 8, 2017, pp. 1-46.

List of IBM Patents and/or Patent Applications Treated as Related, dated Jan. 2, 2018, pp. 1-2.

\* cited by examiner

VECTOR SHIFT AND DIVIDE DECIMAL

DECIMAL SHIFT AND DIVIDE INSTRUCTION

BACKGROUND

One or more aspects relate, in general, to processing within a computing environment, and in particular, to improving such processing.

Applications executing within a processor of a computing environment control the behavior of the processor. The applications are created using programming languages which are designed to communicate instructions to the processor. There are various types of programming languages, and each language may use one or more types of encodings to represent data.

For example, scaled decimal integers (also known as scaled binary coded decimals/scaled BCD) are a common data type in many COBOL and PL/I programs, as well as in DB2 database management systems. A scaled BCD number is a BCD number plus a format descriptor (n·k), where the BCD number is interpreted to have n digits before the decimal point and k digits after the decimal point (i.e., with k fraction digits), or a decimal integer to be multiplied by $10^{-k}$.

Performing addition and subtraction on scaled BCD data with the same k-parameter is straight forward because the data is correctly aligned and the result has the same number of fraction digits. Division is more complex because the integer divide of two numbers delivers the integer part of the quotient. The k fraction digits are missing.

For example, if:

A=4444.44, B=3333.33, Q=0001.333

A normal integer divide delivers the quotient Q=1, but not the fraction digits. Further, conventional code for performing a BCD divide operation can be fairly complex, requiring a lengthy sequence of operations.

SUMMARY

Shortcomings of the prior art are overcome and additional advantages are provided through the provision of a computer program product for facilitating processing in a computing environment. The computer program product comprises a storage medium readable by a processing circuit and storing instructions for execution by the processing circuit for performing a method. The method includes, for instance, obtaining an instruction for execution, the instruction to perform a shift and divide operation. The instruction is executed, and the executing includes shifting a value in a specified direction by a selected amount to provide a dividend. The selected amount is user-defined. The dividend is divided by a divisor to obtain a quotient. At least a subset of the quotient is selected as a result. The result is placed in a selected location, the result to be used in processing within the computing environment. The use of a single instruction to perform a scaled BCD divide operation improves performance by eliminating a lengthy instruction sequence, and reducing the number of instructions to be fetched, decoded and executed.

In one example, the value is a decimal integer, and the at least a subset of the quotient is a selected number of digits of the quotient. The selected number of digits includes a number of integer digits and a number of fraction digits.

Further, in one embodiment, the executing includes determining a sign for the result; and including the sign in the selected location. As one example, the determining the sign includes checking a control provided by the instruction. The control is, e.g., provided in a mask field of the instruction.

Moreover, in one embodiment, the executing includes obtaining the value from one or more fields of the instruction; checking validity of the value; and performing the shifting, based on the checking indicating the value is valid.

In examples, the specified direction is left; the selected amount is obtained from a field of the instruction; and the selected location is a register, the register being specified using at least one field of the instruction. The at least one field includes a register field specifying a register number and an extension field specifying an extension value to be appended to the register number.

Methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

One or more aspects relate to improving processing within a computing environment by providing a capability for replacing a lengthy instruction sequence with a single instruction (e.g., a single architected machine instruction at the hardware/software interface) that performs a shift and divide operation. In one example, the instruction, referred to herein as a Vector Shift and Divide Decimal instruction, shifts an input value by a user-defined amount to provide a dividend and then divides the dividend by a divisor to produce a quotient. At least a part of the quotient is provided as a result.

The instruction performs, for instance, a decimal integer divide operation that provides a quotient with integer digits plus k fraction digits, where k is an input parameter to the instruction. K specifies how many fraction digits are to be computed.

One embodiment of a computing environment to incorporate and use one or more aspects of the present invention is described with reference to FIG. 1A. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

Figure 1A:
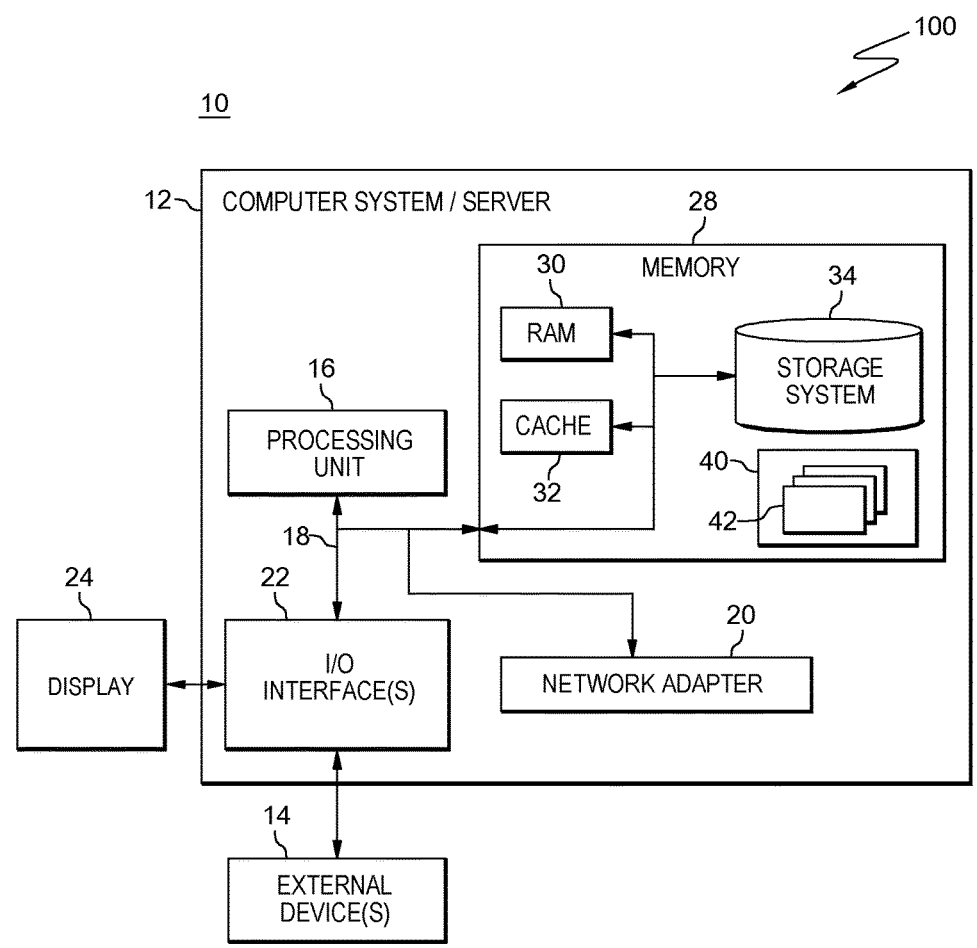
FIG. 1A depicts one example of a computing environment to incorporate and use one or more aspects of the present invention.

As shown in FIG. 1A, a computing environment 100 includes, for instance, a node 10 having, e.g., a computer system/server 12, which is operational with numerous other general purpose or special purpose computing system environments or configurations. Examples of well-known computing systems, environments, and/or configurations that may be suitable for use with computer system/server 12 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in many computing environments, including but not limited to, distributed cloud computing environments where tasks are performed by remote processing devices that are linked through a communications network. In a distributed cloud computing environment, program modules may be located in both local and remote computer system storage media including memory storage devices.

As shown in FIG. 1A, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 1B:
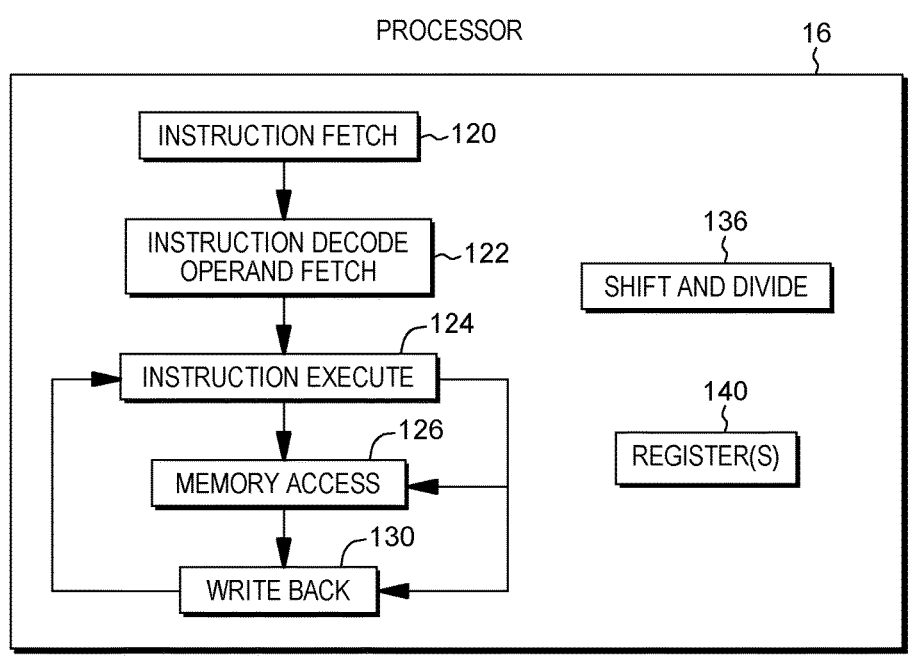
FIG. 1B depicts further details of the processor of FIG. 1A, in accordance with an aspect of the present invention.

In one example, processor 16 includes a plurality of functional components used to execute instructions. As depicted in FIG. 1B, these functional components include, for instance, an instruction fetch component 120 to fetch instructions to be executed; an instruction decode unit 122 to decode the fetched instructions and to obtain operands of the decoded instructions; instruction execution components 124 to execute the decoded instructions; a memory access component 126 to access memory for instruction execution, if necessary; and a write back component 130 to provide the results of the executed instructions. One or more of these components may, in accordance with an aspect of the present invention, be used to perform a decimal shift and divide operation 136, as described further below.

Processor 16 also includes, in one embodiment, one or more registers 140 to be used by one or more of the functional components.

Figure 2A:
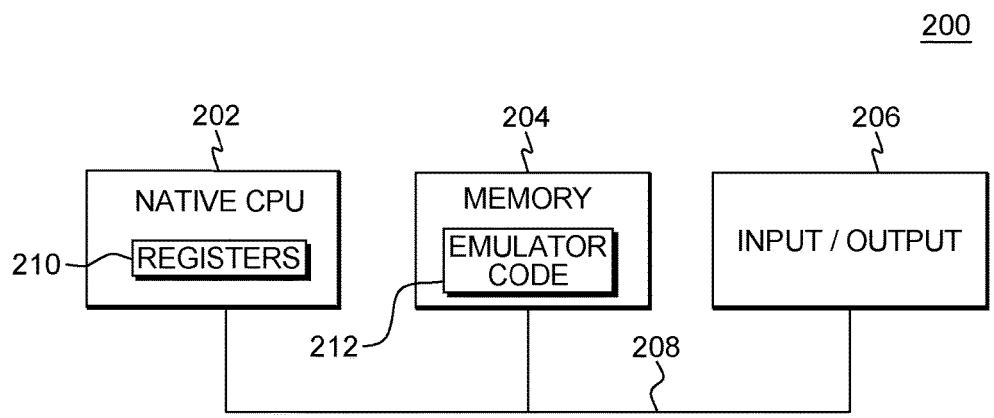
FIG. 2A depicts another example of a computing environment to incorporate and use one or more aspects of the present invention.

Another embodiment of a computing environment to incorporate and use one or more aspects is described with reference to FIG. 2A. In this example, a computing environment 200 includes, for instance, a native central processing unit (CPU) 202, a memory 204, and one or more input/output devices and/or interfaces 206 coupled to one another via, for example, one or more buses 208 and/or other connections. As examples, computing environment 200 may include a PowerPC processor or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represent the state of the environment at any particular point in time.

Moreover, native central processing unit 202 executes instructions and code that are stored in memory 204. In one particular example, the central processing unit executes emulator code 212 stored in memory 204. This code enables the computing environment configured in one architecture to emulate another architecture. For instance, emulator code 212 allows machines based on architectures other than the z/Architecture, such as PowerPC processors, pSeries servers, HP Superdome servers or others, to emulate the z/Architecture and to execute software and instructions developed based on the z/Architecture.

Figure 2B:
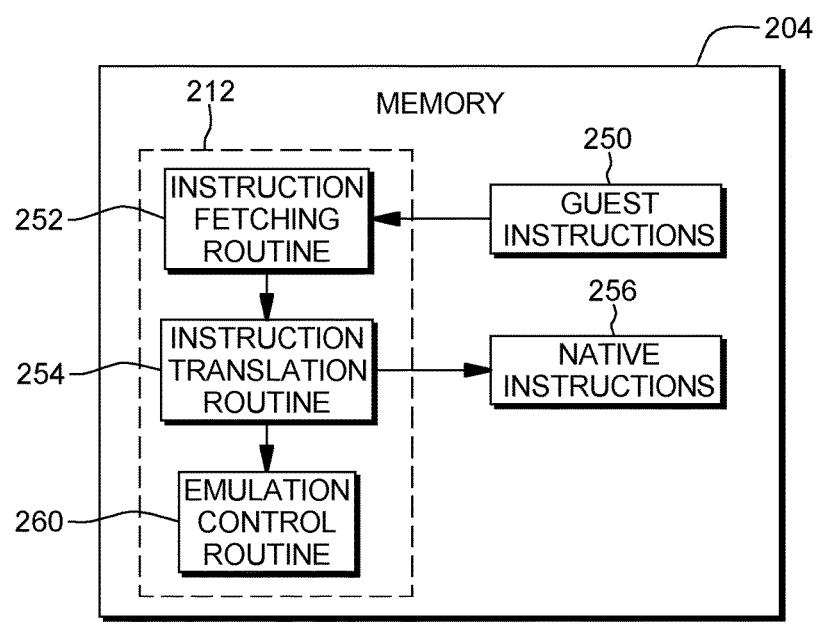
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a z/Architecture processor, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

A guest instruction 250 that is obtained, translated and executed is, for instance, a Vector Shift and Divide Decimal instruction described herein. The instruction, which is of one architecture (e.g., the z/Architecture), is fetched from memory, translated and represented as a sequence of native instructions 256 of another architecture (e.g., PowerPC, pSeries, Intel, etc.). These native instructions are then executed.

Details relating to one embodiment of a Vector Shift and Divide Decimal instruction, including fields of the instruction and execution by at least one processor (either in a native or emulated system) are described herein. In accordance with an aspect of the present invention, the Vector Shift and Divide Decimal instruction shifts an input value by a user-defined amount to provide a dividend and then divides the dividend by a divisor to produce a quotient. At least a part of the quotient (e.g., the rightmost 31 digits) is provided as a result. This result includes integer digits and k fraction digits, where k is equal to the shift amount. This improves computer performance by replacing a lengthy instruction sequence to perform a BCD divide operation with a single instruction (e.g., a single architected machine instruction).

Thus, aspects of the invention are inextricably tied to computer technology, and to the improvement of computer processing.

In one embodiment, the Vector Shift and Divide Decimal instruction is part of a vector facility, which provides, for instance, fixed sized vectors ranging from one to sixteen elements. Each vector includes data which is operated on by vector instructions defined in the facility. In one embodiment, if a vector is made up of multiple elements, then each element is processed in parallel with the other elements. Instruction completion does not occur until processing of all the elements is complete. In other embodiments, the elements are processed partially in parallel and/or sequentially.

Vector instructions can be implemented as part of various architectures, including, but not limited to, the z/Architecture, the Power Architecture, x86, IA-32, IA-64, etc. Although embodiments described herein are for the z/Architecture, the vector instruction described herein and one or more other aspects may be based on many other architectures. The z/Architecture is only one example.

In one embodiment in which the vector facility is implemented as part of the z/Architecture, to use the vector registers and instructions, a vector enablement control and a register control in a specified control register (e.g., control register 0) are set to, for instance, one. If the vector facility is installed and a vector instruction is executed without the enablement controls set, a data exception is recognized. If the vector facility is not installed and a vector instruction is executed, an operation exception is recognized.

In one embodiment, there are 32 vector registers and other types of registers can map to a quadrant of the vector registers. For instance, a register file may include 32 vector registers and each register is 128 bits in length. Sixteen floating point registers, which are 64 bits in length, can overlay the vector registers. Thus, as an example, when floating point register 2 is modified, then vector register 2 is also modified. Other mappings for other types of registers are also possible.

Vector data appears in storage, for instance, in the same left-to-right sequence as other data formats. Bits of a data format that are numbered 0-7 constitute the byte in the leftmost (lowest-numbered) byte location in storage, bits 8-15 form the byte in the next sequential location, and so on. In a further example, the vector data may appear in storage in another sequence, such as right-to-left.

One example of a Vector Shift and Divide Decimal instruction is described with reference to FIGS. 3A-3C. As shown, the instruction has a plurality of fields, and a field may have a subscript number associated therewith. The subscript number associated with a field of the instruction denotes the operand to which the field applies. For instance, the subscript number 1 associated with vector register $V_1$ denotes that the register in $V_1$ includes the first operand, and so forth. A register operand is one register in length, which is, for instance, 128 bits.

Figure 3A:
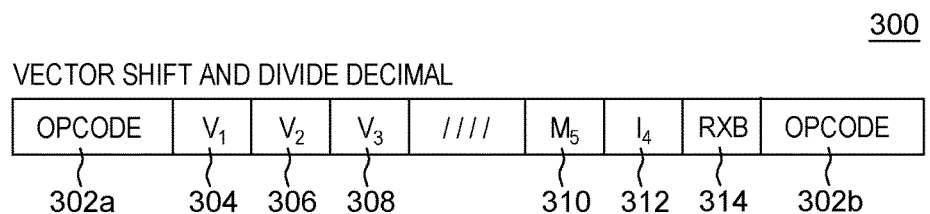
FIG. 3A depicts one example of a Vector Shift and Divide Decimal instruction, in accordance with an aspect of the present invention.
Figure 3B:
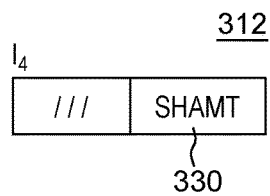
FIG. 3B depicts one embodiment of an immediate field of the Vector Shift and Divide Decimal instruction of FIG. 3A, in accordance with an aspect of the present invention.

Referring to FIG. 3A, in one embodiment, a Vector Shift and Divide Decimal instruction 300 includes opcode fields 302a, 302b indicating a vector shift and divide decimal operation; a first vector register field 304 used to designate a first vector register ($V_1$); a second vector register field 306 used to designate a second vector register ($V_2$); a third vector register field 308 used to designate a third vector register ($V_3$); a mask field ($M_5$) 310; an immediate field ($I_4$) 312; and a register extension bit (RXB) field 314, each of which is described below. In one embodiment, the fields are separate and independent from one another; however, in other embodiments, more than one field may be combined. Further information regarding these fields is described below.

Vector register field 304 is used to indicate a vector register that is to store the first operand, the first operand being a result of shifting a second operand to obtain a dividend, dividing the dividend by a third operand (the divisor) to obtain a quotient, and selecting at least a part of the quotient as the result. The second operand is contained in the vector register specified using vector register field 306 and the third operand (the divisor) is contained in the vector register specified using vector register field 308. In one example, each of vector register fields 304, 306, 308 is used with RXB field 314 to designate the vector register.

For instance, RXB field 314 includes the most significant bit for a vector register designated operand. Bits for register designations not specified by the instruction are to be reserved and set to zero. The most significant bit is concatenated, for instance, to the left of the four-bit register designation of the vector register field to create a five-bit vector register designation.

In one example, the RXB field includes four bits (e.g., bits 0-3), and the bits are defined, as follows:
  0—Most significant bit for the first vector register designation (e.g., in bits 8-11) of the instruction.
  1—Most significant bit for the second vector register designation (e.g., in bits 12-15) of the instruction, if any.
  2—Most significant bit for the third vector register designation (e.g., in bits 16-19) of the instruction, if any.
  3—Most significant bit for the fourth vector register designation (e.g., in bits 32-35) of the instruction, if any.

Each bit is set to zero or one by, for instance, the assembler depending on the register number. For instance, for registers 0-15, the bit is set to 0; for registers 16-31, the bit is set to 1, etc.

In one embodiment, each RXB bit is an extension bit for a particular location in an instruction that includes one or more vector registers. For instance, bit 0 of RXB is an extension bit for location 8-11, which is assigned to, e.g., $V_1$ and so forth. In particular, for vector registers, the register containing the operand is specified using, for instance, a four-bit field of the register field with the addition of its corresponding register extension bit (RXB) as the most significant bit. For instance, if the four bit field is 0110 and the extension bit is 0, then the five bit field 00110 indicates register number 6. In a further embodiment, the RXB field includes additional bits, and more than one bit is used as an extension for each vector or location.

Immediate ($I_4$) field 312 specifies a fourth operand that includes a shift control. For instance, $I_4$ field 312 includes the following, as depicted in FIG. 3B:
  Reserved: Bits 0-2 are reserved and are to contain zeros. Otherwise, a specification exception is recognized, in one example.
  Shift Amount (SHAMT) 330: Bits 3-7 contain an unsigned binary number specifying the number of digits the second operand is shifted, e.g., left, to form the dividend. The sign position does not participate in the shift. Zeros are supplied for the vacated digit positions.

Figure 3C:
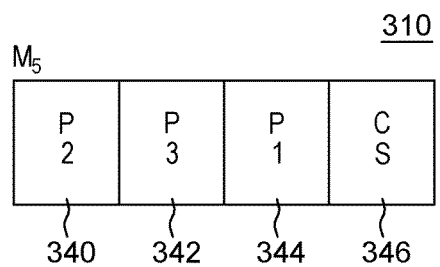
FIG. 3C depicts one embodiment of a mask field of the Vector Shift and Divide Decimal instruction of FIG. 3A, in accordance with an aspect of the present invention.

$M_5$ field 310 includes, in one example, the following controls, as depicted in FIG. 3C:
  Force Operand 2 Positive (P2) 340: When bit 0 is one, the second operand sign is treated as a positive sign and is not checked for validity. When bit 0 is zero, the second operand sign is used in the operation and is checked for validity.

Force Operand 3 Positive (P3) 342: When bit 1 is one, the third operand sign is treated as a positive sign and is not checked for validity. When bit 1 is zero, the third operand sign is used in the operation and is checked for validity.

Force Operand 1 Positive (P1) 344: When bit 2 is one, the sign of the result placed in the first operand is forced to positive and a sign code of 1111 is used. When bit 2 is zero, the sign of the result placed in the first operand is the selected sign code for the sign of the quotient.

Condition Code Set (CS) 346: When bit 3 is zero, the condition code is not set and remains unchanged. When bit 3 is one, the condition code is set as specified in the resulting condition code section below.

Resulting Condition Code:

When the CS bit is one, the condition code is set, as follows, in one example:

0 Result zero; no overflow
1 Result less than zero; no overflow
2 Result greater than zero; no overflow
3 Overflow Although various fields and registers are described, one or more aspects of the present invention may use other, additional or less fields or registers, or other sizes of fields or registers, etc. Many variations are possible. For instance, implied registers may be used instead of explicitly specified registers or fields of the instruction. Further, registers other than vector registers may be used. Again, other variations are also possible.

In operation, the second operand, shifted left (the dividend) by the number of digits specified in the fourth operand, is divided by the third operand (the divisor), and a selected number of digits, e.g., the rightmost thirty one digits of the quotient, are placed in the first operand location. The operands and result are in, e.g., the signed packed decimal format.

In one example, in the signed packed decimal format, each byte contains two decimal digits (D), except for the rightmost byte, which contains a sign (S) to the right of a decimal digit. Decimal arithmetic is performed with operands and generates results in the signed packed decimal format.

The sign codes of the second and third operands may be modified for use in the operation by the force operand two positive (P2) control and the force operand three positive (P3) control, respectively.

In one example, all digit codes are checked for validity. The sign codes are checked for validity unless overridden by the force operand two positive (P2) or force operand three positive (P3) controls.

If the first operand cannot contain all leftmost nonzero digits of the quotient, a decimal overflow occurs. The operation is completed and the result is obtained by ignoring the overflow digits. If the condition code set (CS) flag is one, condition code 3 is set. If a decimal overflow control in a program mask included, e.g., as part of the program status word is one, a program interrupt for decimal overflow occurs.

When the rightmost thirty one digits of the quotient are nonzero and the force operand one positive (P1) control is zero, rules of algebra from the dividend and divisor signs determine the sign of the result and a selected sign code is used. When the rightmost thirty one digits of the quotient are zero and the P1 control is zero, the sign of the result is made positive with selected sign code 1100. When the P1 control is one, the sign of the result is made positive with sign code 1111.

If the divisor is zero and the divisor sign code used is valid, a decimal divide exception is recognized. This includes the case of division of zero by zero. The divisor sign code used is the third operand sign code when the force operand 3 positive (P3) bit is zero, and is a positive sign code when the force operand 3 positive (P3) bit is one.

Further details regarding operation of the instruction are described with reference to FIG. 4. In one example, the logic of FIG. 4 is performed by at least one processor based on obtaining and executing the Vector Shift and Divide Decimal instruction.

Figure 4:
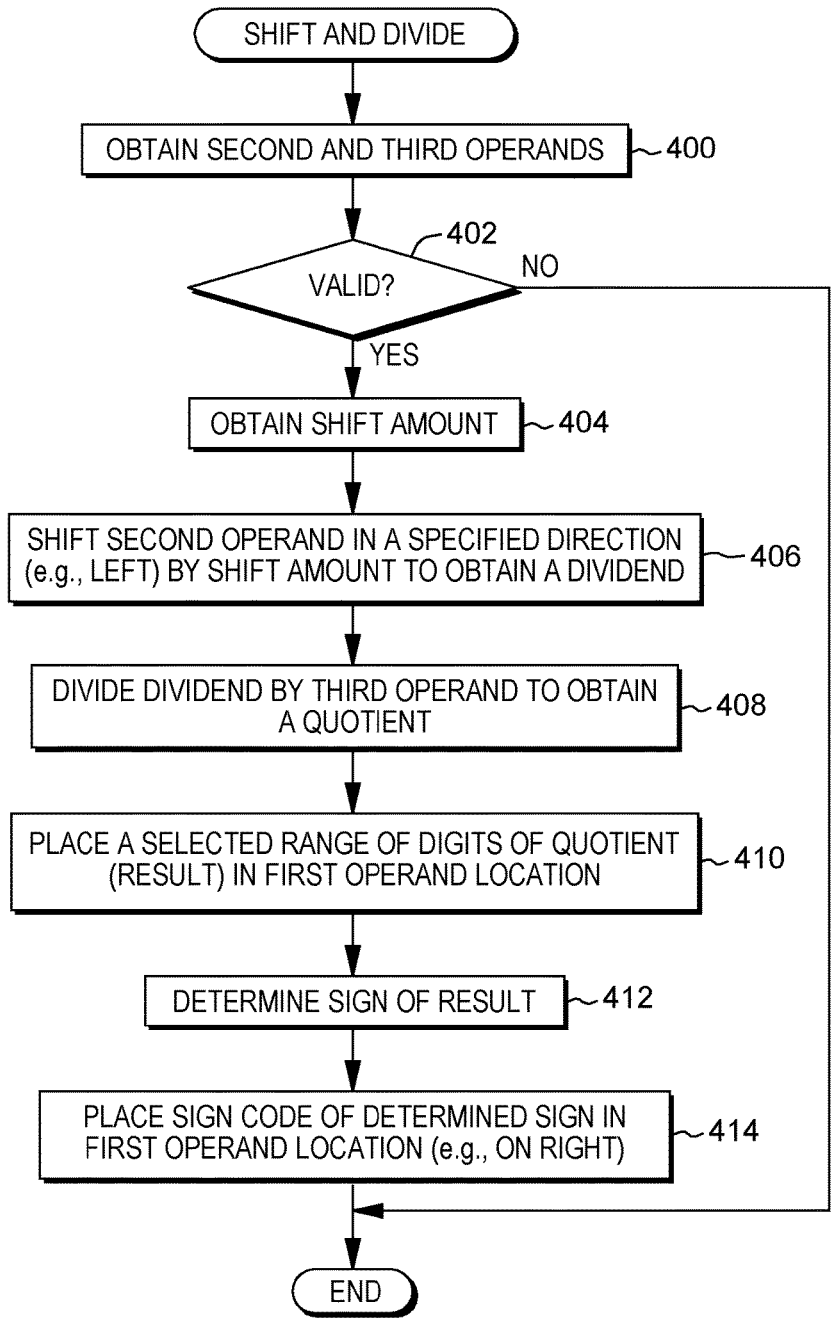
FIG. 4 depicts one example of a block diagram of execution of the Vector Shift and Divide Decimal instruction, in accordance with an aspect of the present invention.

Referring to FIG. 4, initially, the second operand and the third operand (the divisor) are obtained from the registers designated using the $V_2$ and $V_3$ fields of the instruction, STEP 400. In one example, the digits of the second and third operands are checked for validity. In particular, in one example, all digit codes are checked for validity. If one or more of the digits is invalid, INQUIRY 402, then processing is complete and an error may be indicated, in one example. However, if the digits of the second and third operands are valid, then processing continues with obtaining the shift amount, STEP 404. In one example the shift amount is user-defined and provided by the instruction (e.g., $I_4$ 312).

The second operand is shifted in a specified direction (e.g., left) by the shift amount to obtain a dividend, STEP 406. The dividend is divided by the third operand to obtain a quotient, STEP 408. A selected range of digits of the quotient (e.g., rightmost 31 digits) is selected as the result, which is placed in the first operand location (e.g., the register designated using $V_1$), STEP 410.

Moreover, a sign of the result is determined, STEP 412. For instance, When the rightmost thirty one digits of the quotient are nonzero and the force operand one positive (P1) control is zero, rules of algebra from the dividend and divisor signs determine the sign of the result and a selected sign code is used. When the rightmost thirty one digits of the quotient are zero and the P1 control is zero, the sign of the result is made positive with selected sign code 1100. When the P1 control is one, the sign of the result is made positive with sign code 1111.

If the divisor is zero and the divisor sign code used is valid, a decimal divide exception is recognized. This includes the case of division of zero by zero. The divisor sign code used is the third operand sign code when the force operand 3 positive (P3) bit is zero, and is a positive sign code when the force operand 3 positive (P3) bit is one.

The sign code of the determined sign is placed in the first operand location (e.g., on the right), STEP 414. This completes processing of one embodiment of the shift and divide instruction.

In a further embodiment, the shift may be to the right and/or the direction of the shift may be selectable by a control of the instruction. Other variations are possible.

Further details regarding decimal integer divides are provided below.

One previous decimal divide instruction, DP, computes the quotient Q and remainder R for A divided by B, such that A=Q*B+R. A can have up to a 31-digit length, but B can have at most 15 digits, and is to have less digits than A. By limiting the length of the divisor, a severe limitation is placed on the type of divides.

With another decimal instruction, VDP, both A and B can have a full width of up to 31 digits; relaxing the length limitations of the DP instruction. However, with both instructions only the integer part is provided; no fraction digits are provided.

For a scaled BCD divide (n·k), lengthy routines with multiple divide operations are used to obtain the k fraction digits in addition to the integer part of the quotient.

The above is further described with reference to FIGS. 5A-5B.

Figure 5A:
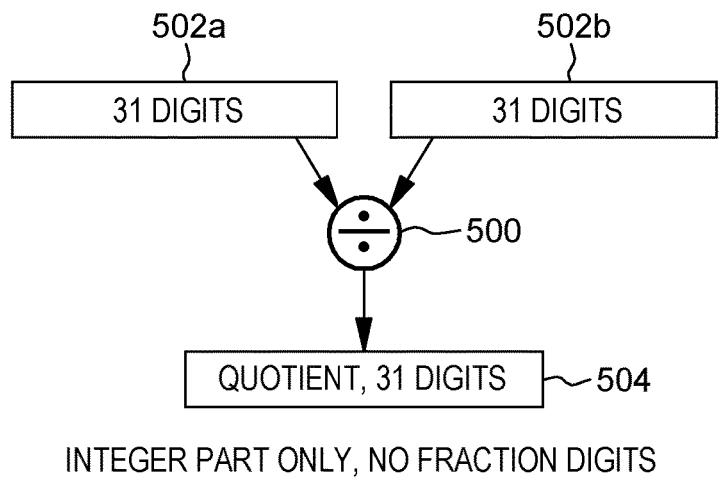
FIG. 5A pictorially depicts one example of a BCD divide operation.

As shown in FIG. 5A, when performing an integer divide 500 of two full width BCD numbers 502a, 502b (e.g., 31 digits), the quotient 504 is a BCD integer with at most, e.g., 31 digits; no fraction digits are provided.

For a scaled BCD divide operation, the 31 digits of the input are interpreted as some "n" integer digits (before the decimal point) and some "k" fraction digits (after the decimal point). The desired quotient usually has the same number of fraction digits as the operands.

Consider the example: Q(7.3)=A(4.3)/B(4.3), as shown in FIG. 5B.

Figure 5B:
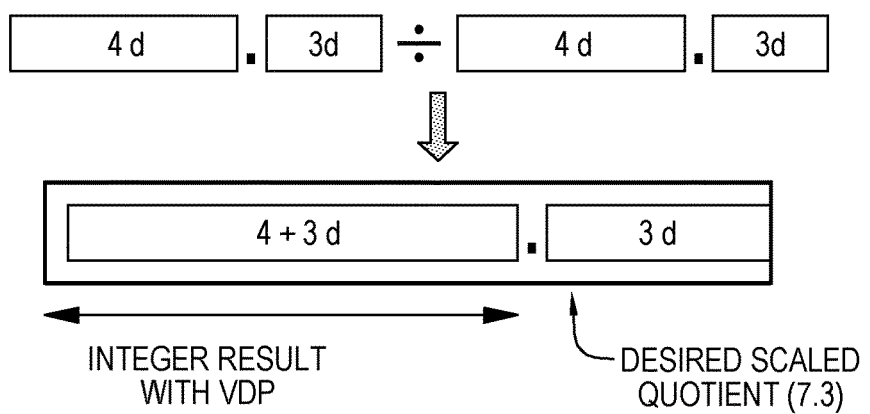
FIG. 5B pictorially depicts another example of a BCD divide operation.

FIG. 5B and the examples below indicate that even the enhanced VDP only provides the integer part of the quotient, and not the desired fraction digits.

Here are some examples:
A=8888.888 B=0000.003→Q=2962962.666
B=3333.333→Q=0000002.666

To obtain the desired number of fraction digits of the quotient, some extra processing is needed.

For a scaled BCD divide with (n·k), consider the following cases:
1. n+k+k<32: then "A" can be shifted right by k prior to the divide operation, obtaining $A'=A*10^k$. The desired quotient with k fraction digits can then be obtained by a regular decimal divide of A' (n+k,0) and B (n·k).
2. n+k+k>31: "A" cannot be shifted to the right by k because it would exceed the maximal number of digits. It now makes a difference whether B can have just half length (DP) or whether B can have full length (VDP).
In case of half length, and k<15
DP: A=Q1*B+R1—compute quotient and remainder; note that R1<B . . . has at most 15 digits
SRP: R'=R1<<k
DP: R'=Q2*B+R2—compute quotient remainder is not needed
Q=(Q1<<k)+Q2

In case of a 31 digit B, the above algorithm does not work, and thus, the operands are converted to decimal floating point (DFP), a floating point divide is performed, and the desired mantissa digits are extracted. Further, depending on the DFP implementation, this still may not be sufficient, and an even more involved technique is to be used.

Thus, in either case, it is a lengthy routine to perform the scaled BCD divide.

In accordance with an aspect of the present invention, a lengthy instruction sequence to perform a scaled BCD divide is replaced by a single instruction (e.g., an architected instruction, such as an architected hardware instruction) that performs a decimal shift and divide operation.

Figure 5C:
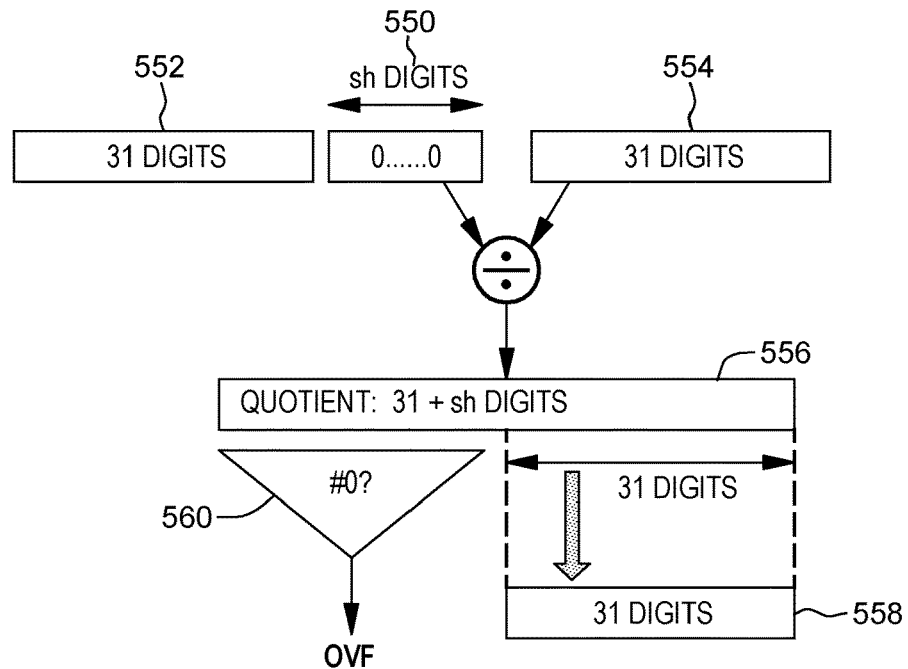
FIGS. 5C-5D pictorially depict examples of a BCD shift and divide operation, in accordance with an aspect of the present invention.

In one embodiment, as depicted in FIG. 5C, the instruction, Vector Shift and Divide Decimal, specifies, in accordance with an aspect of the present invention, a width, sh (550). The A operand (552) is shifted left by sh digits obtaining an $A'=A<<sh=A*10^{sh}$. The A' is then divided by the B operand (554) obtaining an integer quotient Q (556). The rightmost 31 digits are selected, in one example, as the result (558). An overflow (560) is detected when the quotient Q has more than 31 significant digits.

Figure 5D:
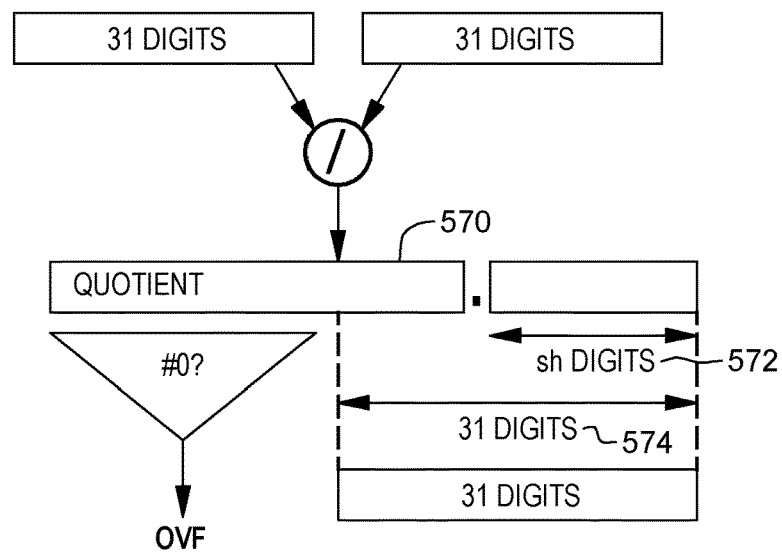

This can also be interpreted, as shown in FIG. 5D, as computing the integer and fraction part of the quotient 570 of A/B, and as a result selecting sh fraction digits (572) and 31-sh integer digits (574).

The instruction provided in accordance with an aspect of the present invention turns the scaled BCD divide operation with width (n·k) into a single shift and divide instruction with sh=k, thereby replacing a lengthy instruction sequence with a single instruction, significantly increasing the speed at which scaled BCD divide operations are performed, and improving processing within a computing environment. The instruction also provides more flexibility in that a scaled divide with arbitrary (i.e., not fixed, variable) scaling k is provided. The instruction provides an arbitrary definition of the bit-set of the integer and fraction digits of the quotient, and performs the overflow check based on the arbitrary bit-set. Such operations may be used by many types of applications and other processing of the computing environment.

Further details relating to facilitating processing within a computing environment, including executing an instruction to perform a shift and divide operation, are described with reference to FIGS. 6A-6B.

Figure 6A:
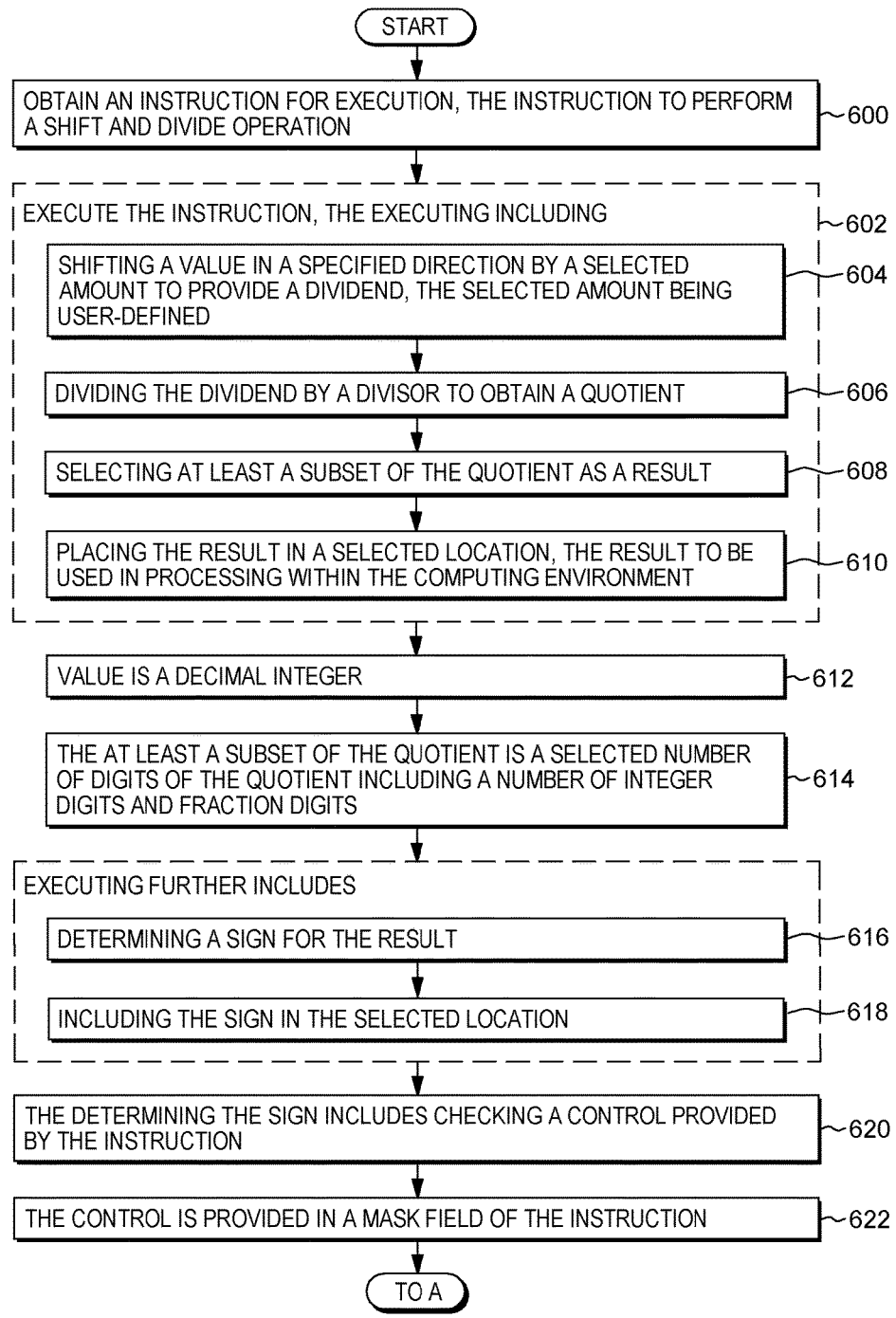
FIGS. 6A-6B depict one example of facilitating processing in a computing environment, including execution of the Vector Shift and Divide Decimal instruction, in accordance with an aspect of the present invention.

Referring to FIG. 6A, an instruction (e.g., an architected machine instruction) to perform a shift and divide operation is obtained, STEP 600, and executed by at least one processor, STEP 602. The executing includes, for instance, shifting a value in a specified direction by a selected amount to provide a dividend, the selected amount being user-defined, STEP 604. The dividend is divided by a divisor to obtain a quotient, STEP 606. At least a subset of the quotient (e.g., the rightmost 31 digits) is selected as a result, STEP 608. The result is placed in a selected location, the result to be used in processing within the computing environment, STEP 610.

As one example, the value is a decimal integer (612), and the least a subset of the quotient is a selected number of digits of the quotient, the selected number of digits, including a number of integer digits and a number of fraction digits (614).

In a further embodiment, the executing further includes determining a sign for the result, STEP 616; and including the sign in the selected location, STEP 618. In one example, the determining the sign includes checking a control provided by the instruction, STEP 620; and the control is provided, e.g., in a mask field of the instruction (622).

Figure 6B:
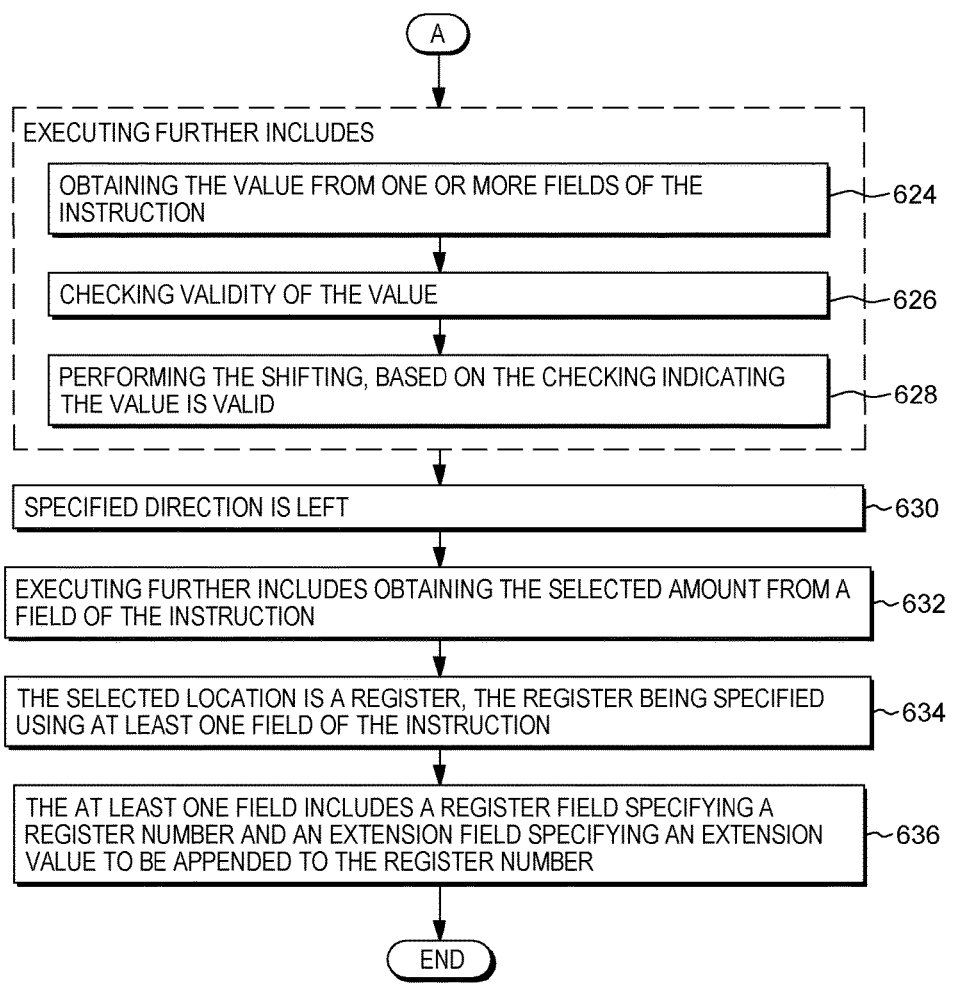

Further, with reference to FIG. 6B, in one example, the executing includes obtaining the value from one or more fields of the instruction, STEP 624; checking validity of the value, STEP 626; and performing the shifting, based on the checking indicating the value is valid, STEP 628.

As examples, the specified direction is left (630); the selected amount is obtained from a field of the instruction (632), and the selected location is a register, the register being specified using at least one field of the instruction (634). The at least one field includes a register field specifying a register number and an extension field specifying an extension value to be appended to the register number (636).

Described herein is a facility for using a single architected instruction to perform BCD division. This instruction replaces a lengthy instruction sequence, and improves computer processing and performance.

Although various examples are provided, variations are possible without departing from a spirit of the claimed aspects. For example, values that are included in registers and/or fields used by the instruction may, in other embodiments, be in other locations, such as memory locations, etc. Many other variation are possible.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes. One such node is node 10 depicted in FIG. 1A.

Computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

Figure 7:
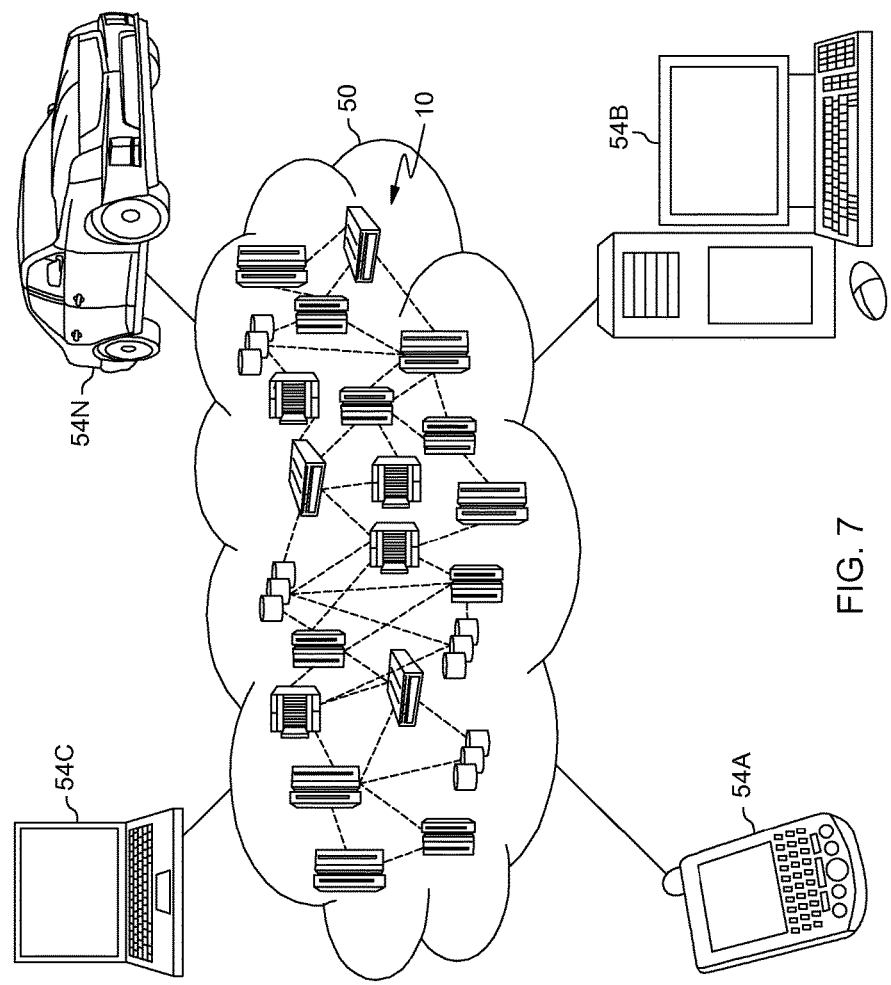
FIG. 7 depicts one embodiment of a cloud computing environment.

Referring now to FIG. 7, illustrative cloud computing environment 50 is depicted. As shown, cloud computing environment 50 comprises one or more computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
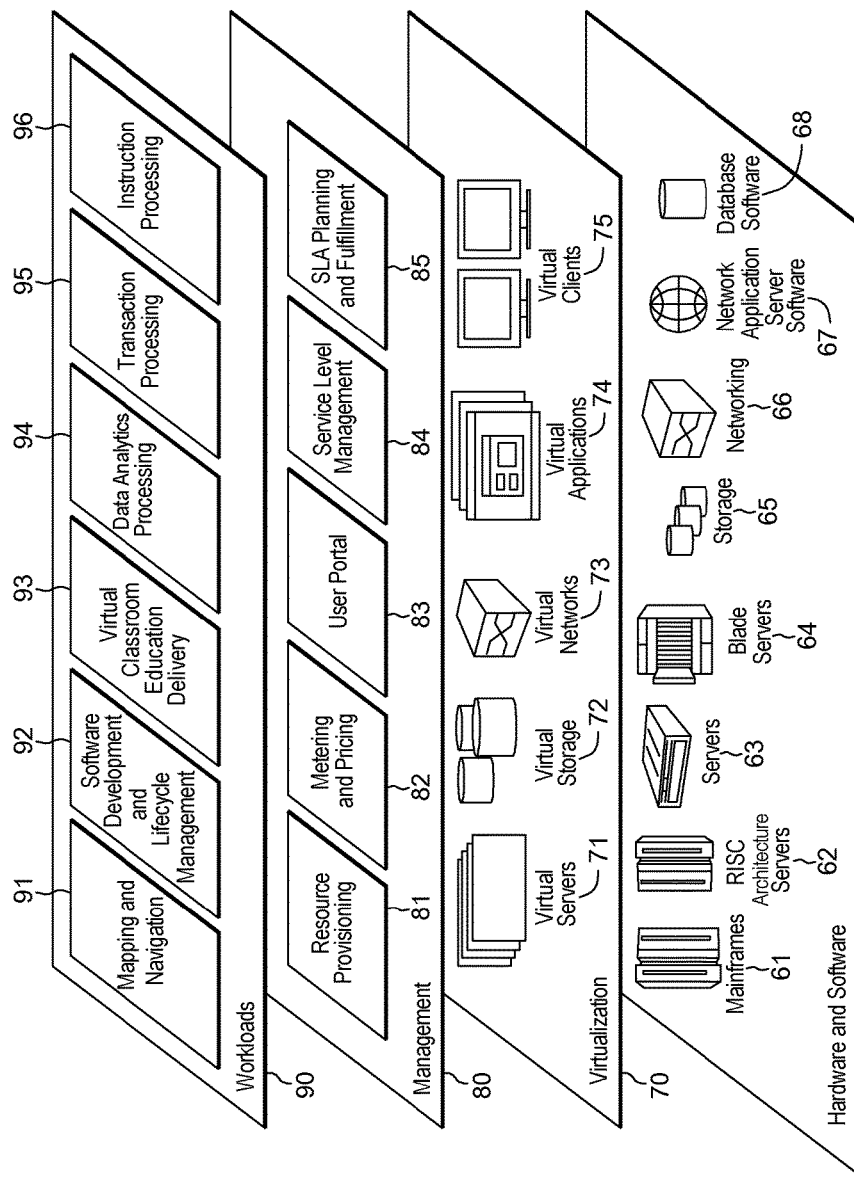
FIG. 8 depicts one example of abstraction model layers.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and instruction processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   a computer readable storage medium readable by a processing circuit and storing instructions for execution by the processing circuit for performing a method comprising:
   obtaining a single instruction for execution, the single instruction to perform a shift and divide operation; and
   executing the single instruction, the executing comprising:
   shifting a value in a specified direction by a selected amount to provide a dividend, the selected amount being user-defined;

dividing the dividend by a divisor to obtain a quotient;
selecting at least a subset of the quotient as a result in a signed packed decimal format;
determining a sign for the result from a mask field of the single instruction; and
placing the result and the sign in a selected location, wherein the sign is placed to a right of a decimal digit in the signed packed decimal format of the result in the selected location, the result to be used in processing within the computing environment.

2. The computer program product of claim 1, wherein the value is a decimal integer, and the least a subset of the quotient is a selected number of digits of the quotient, the selected number of digits including a number of integer digits and a number of fraction digits.

3. The computer program product of claim 1, wherein the mask field of the single instruction comprises a control provided by the single instruction.

4. The computer program product of claim 1, wherein the executing further comprises:
obtaining the value from one or more fields of the single instruction;
checking validity of the value; and
performing the shifting, based on the checking indicating the value is valid.

5. The computer program product of claim 1, wherein the specified direction is left.

6. The computer program product of claim 1, wherein the executing further comprises obtaining the selected amount from a field of the single instruction.

7. The computer program product of claim 1, wherein the selected location is a register, the register being specified using at least one field of the single instruction.

8. The computer program product of claim 7, wherein the at least one field comprises a register field specifying a register number and an extension field specifying an extension value to be appended to the register number.

9. A computer system for facilitating processing within a computing environment, the computer system comprising:
a memory; and
a processor in communication with the memory, wherein the computer system is configured to perform a method, said method comprising:
obtaining a single instruction for execution, the single instruction to perform a shift and divide operation; and executing the single instruction, the executing comprising:
shifting a value in a specified direction by a selected amount to provide a dividend, the selected amount being user-defined;
dividing the dividend by a divisor to obtain a quotient;
selecting at least a subset of the quotient as a result in a signed packed decimal format;
determining a sign for the result from a mask field of the single instruction; and
placing the result and the sign in a selected location, wherein the sign is placed to a right of a decimal digit in the signed packed decimal format of the result in the selected location, the result to be used in processing within the computing environment.

10. The computer system of claim 9, wherein the value is a decimal integer, and the least a subset of the quotient is a selected number of digits of the quotient, the selected number of digits including a number of integer digits and a number of fraction digits.

11. The computer system of claim 9, wherein the mask field of the single instruction comprises a control provided by the single instruction.

12. The computer system of claim 9, wherein the executing further comprises obtaining the selected amount from a field of the single instruction.

* * * * *